United States Patent [19]

Halmi

[11] Patent Number: 4,671,119

[45] Date of Patent: Jun. 9, 1987

[54] FLOW MEASURING DEVICE FOR PARTIALLY FILLED CONDUITS

[75] Inventor: Dezsoe Halmi, Cranston, R.I.

[73] Assignee: D. Halmi and Associates, Inc., Pawtucket, R.I.

[21] Appl. No.: 854,749

[22] Filed: Apr. 21, 1986

[51] Int. Cl.[4] .............................................. G01F 1/00
[52] U.S. Cl. ..................................................... 73/215
[58] Field of Search .............................. 73/215, 861.61

[56] References Cited

U.S. PATENT DOCUMENTS

| | | | |
|---|---|---|---|
| 2,100,219 | 11/1937 | Hennison | 73/215 |
| 3,124,000 | 3/1964 | Melas | 73/215 |
| 3,427,878 | 2/1969 | Gerlitz, Jr. et al. | 73/215 |
| 3,719,081 | 3/1973 | Lynn et al. | 73/215 |
| 3,934,472 | 1/1976 | Bradham | 73/215 |

Primary Examiner—Herbert Goldstein
Attorney, Agent, or Firm—Salter & Michaelson

[57] ABSTRACT

A flow measuring device for measuring the flow rate of a fluid in a partially filled conduit comprises sequentially disposed inlet transition and converging sections and means for determining the level of the fluid in the converging section. The inlet section has a substantially circular cross-sectional configuration, and the converging section has a substantially rectangular cross-sectional configuration, although it has a gradually reducing width in its longitudinal extent to the downstream end thereof. The transition section has an interior configuration which provides a substantially smooth transition between the circular inlet section and the rectangular converging section to avoid introducing turbulence and irregular flow patterns into a fluid passing through the device. A second embodiment of the device includes removable inserts which further reduce the width of the converging section adjacent the downstream end thereof to adapt the device to operate under reduced flow conditions.

6 Claims, 8 Drawing Figures

FLOW MEASURING DEVICE FOR PARTIALLY FILLED CONDUITS

BACKGROUND AND SUMMARY OF THE INVENTION

The instant invention relates to flow measuring devices and more particularly to a flow measuring device for measuring the flow rate of a fluid in a partially filled conduit.

While a variety of different types of devices have been heretofore available for measuring the flow rates of fluids in conduits, most of them have only been operative for measuring fluid flow rates in entirely filled conduits. However, it has been found that in certain types of fluid systems there can also be a need for providing accurate flow measurements of fluids as they pass through partially filled conduits. For example, many gravity-fed systems, such as sewage treatment systems, comprise various lines, including inlet lines, which are normally only partially filled but which discharge or spill freely into large pools, tanks or conduits. In order to accurately monitor the flow rates of the various streams in systems of this type, it can be necessary to provide devices in the partially filled lines thereof for monitoring the flow rates in these lines. One of the most common types of heretofore-available flow measuring devices which has been utilized for applications of this type and which represents the closest prior art to the subject invention of which the applicant is aware is the Parshall flume device. A Parshall flume device consists of an open channel-like conduit having a substantially horizontal bottom wall, a pair of spaced, upstanding sidewalls which converge in a downstream direction and terminate in an open downstream end, and a pressure tap for measuring the head pressure adjacent the bottom wall. However, while it has been found that Parshall flume devices can be effectively utilized for many applications, it has also been found that they can be less than entirely effective when they are connected to tubular pipe sections of round or circular cross section. Specifically, it has been found that when fluid is transferred directly from a pipe section of circular cross section into a Parshall flume device of rectangular cross-section, irregular flow patterns and turbulence can be created in the fluid which can cause the Parshall flume device to produce inaccurate flow readings. Another type of device which has been heretofore available for measuring the flow rates of fluids in partially filled conduits is the Kennison nozzle, which comprises an elongated rounded or concave bottom wall, a pair of elongated, spaced, upwardly convex side walls which extend upwardly from the bottom wall, and a pressure tap for measuring the head pressure adjacent the bottom wall. However, it has been found that while a Kennison nozzle can be effectively connected to and utilized with a pipe section of circular cross section, a Kennison nozzle generally has a non-linear flow curve which can make flow calculations more difficult. It has also been found that the unusual interior cross-sectional configuration of a Kennison nozzle can make it difficult to inspect a device of this type to make sure that it is capable of producing accurate readings. In addition to Parshall flume devices and Kennison nozzles, other types of flow measuring devices have also been heretofore available for measuring the flow rates of fluids in partially filled conduits. However, they have generally had the same disadvantages as the Parshall flume devices and the Kennison nozzles, and hence they have also generally been less than entirely satisfactory.

The instant invention provides a device for measuring the flow rates of fluids in partially filled conduits which is simple to operate and highly effective for producing accurate flow-measurement readings. The device of the instant invention is also easy to inspect, and it is adjustable to adapt it for different flow ranges. Specifically, the device of the instant invention comprises sequentially disposed inlet, transition, and converging sections and means for determining the level of the fluid in the converging section. The inlet section is constructed so that it has a substantially circular interior cross-sectional configuration, and the converging section comprises a substantially flat bottom wall and a pair of spaced, longitudinally converging sidewalls which extend substantially perpendicularly upwardly from the bottom wall. The transition section extends between the inlet section and the converging section, and it is configured so that it provides a substantially smooth transition between the interior of the inlet section and the interior of the converging section. The transition section preferably has a length which is at least as great as one-half of the diameter of the inlet section, and the upstream end of the converging section preferably has a width which is substantially equal to the diameter of the inlet section. The sidewalls in the converging section are preferably substantially straight, and the bottom wall is preferably also substantially straight, although an upwardly inclined lip is preferably provided on the bottom wall adjacent the downstream end of the converging section. The means for determining the level in the converging section preferably comprises means for sensing the pressure in the interior of the converging section adjacent the bottom wall.

For use and operation of the flow measuring device of the instant invention, the inlet section is connected to a pipe section of substantially circular cross section so that the bottom wall of the flow measuring device is in a substantially horizontal disposition wherein the downstream end thereof is substantially unobstructed whereby a fluid can spill freely therefrom. Thereafter, when a fluid is passed through the device, the flow rate of the fluid can be accurately and effectively measured utilizing the pressure sensing means in the converging section. In this regard, since the converging section has a rectangular cross-sectional configuration, the pressure which is sensed by the pressure sensing means is directly proportional to the height of the fluid in the converging section, and this can be easily correlated to the flow rate of the fluid. Further, since the device includes a transition section which provides a smooth transition between the inlet section and the converging section, a fluid can be passed into the converging section without producing irregular flow patterns and turbulence therein. Still further, since the device preferably includes a lip on the bottom wall of the converging section adjacent the downstream end thereof, it is possible to more easily calibrate the device for zero-flow conditions. Specifically, when the flow through the device is shut off, the lip enables the device to reach a zero-flow condition without requiring that all of the residual fluids in the device and the pipe sections connected thereto be completely drained from the device. Accordingly, a zero-flow condition can be reached within a matter of minutes, whereas it might take several hours to reach a zero-flow condition with another type of flow measuring device.

One embodiment of the device of the instant invention is constructed so that it is also adjustable to increase or decrease the capacity thereof. Specifically, this embodiment of the device preferably includes removable wedge-shaped inserts which are positioned along the inner sides of the sidewalls of the converging section adjacent the downstream end thereof. The inserts are constructed so that they gradually reduce the width of the converging section by an increased amount and so that they therefore reduce the capacity of the flow measuring device. However, the inserts are constructed and secured to the sidewalls so that they are removable to increase the capacity of the device. Accordingly, the device can be installed in a system, such as a sewage treatment system, and initially operated with the inserts in place in the converging section. Thereafter, however, if it becomes necessary to increase the capacity of the system, the inserts can be removed to enable the device to operate at a higher flow range.

Accordingly, it is a primary object of the instant invention to provide an effective flow measuring device for partially filled pipe sections.

Another object of the instant invention is to provide an effective device for measuring the flow rates of fluids in partially filled pipe sections, which can be adapted to operate at different flow ranges.

A still further object of the instant invention is to provide a device for measuring the flow rates of fluids in partially filled pipe sections comprising an inlet section of substantially circular cross section, a converging section of substantially rectangular cross section, and a transition section which provides a substantially smooth transition between the inlet section and the converging section.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
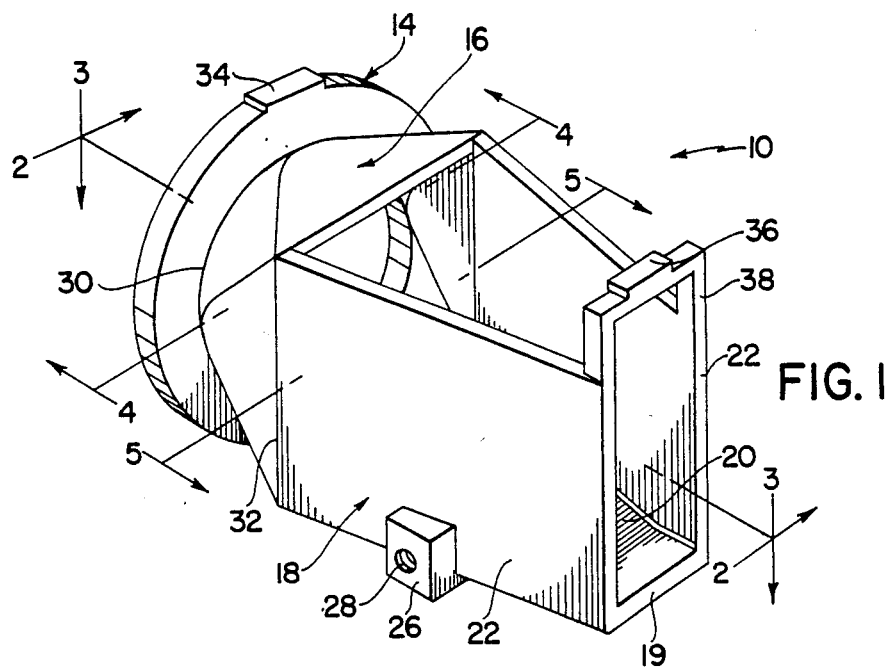
FIG. 1 is a perspective view of a first embodiment of the flow measuring device of the instant invention.
Figure 2:
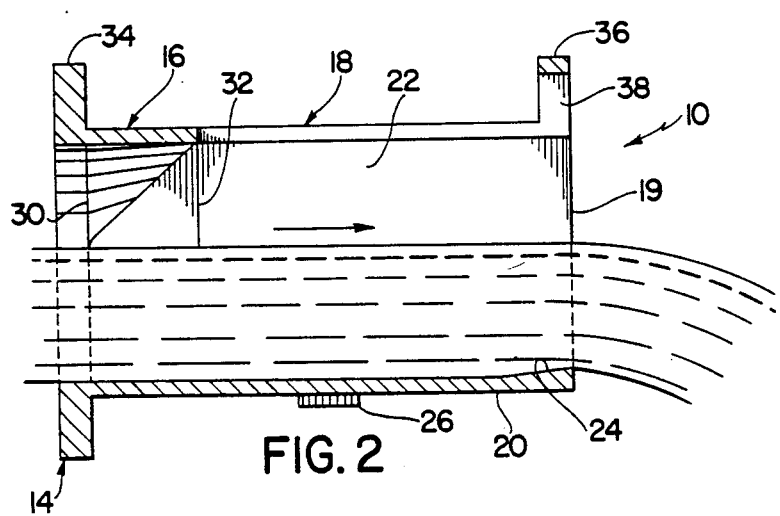
FIG. 2 is a sectional view taken along line 2—2 in FIG. 1.
Figure 5:
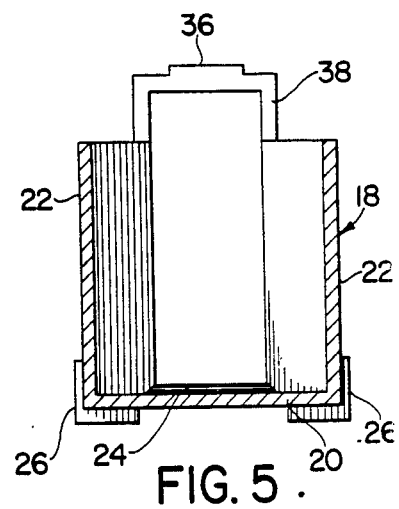
FIG. 5 is a sectional view taken along line 5—5 in FIG. 1.
Figure 4:
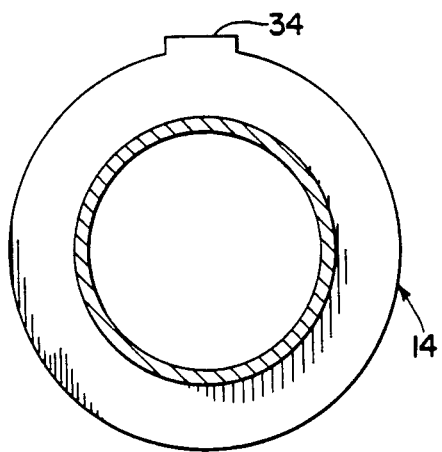
FIG. 4 is a sectional view taken along line 4—4 in FIG. 1.
Figure 3:
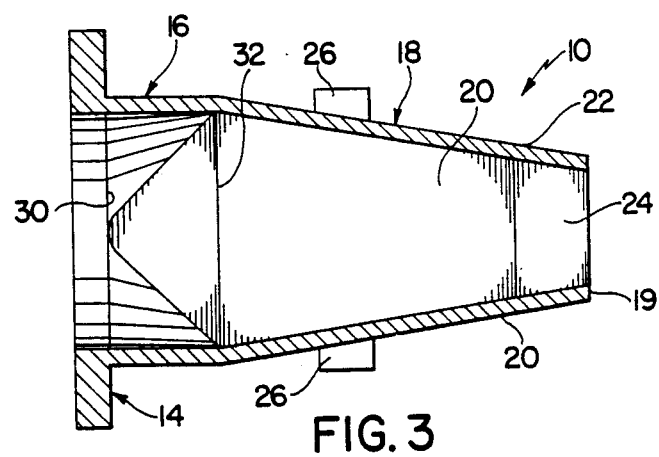
FIG. 3 is a sectional view taken along line 3—3 in FIG. 1.
Figure 6:
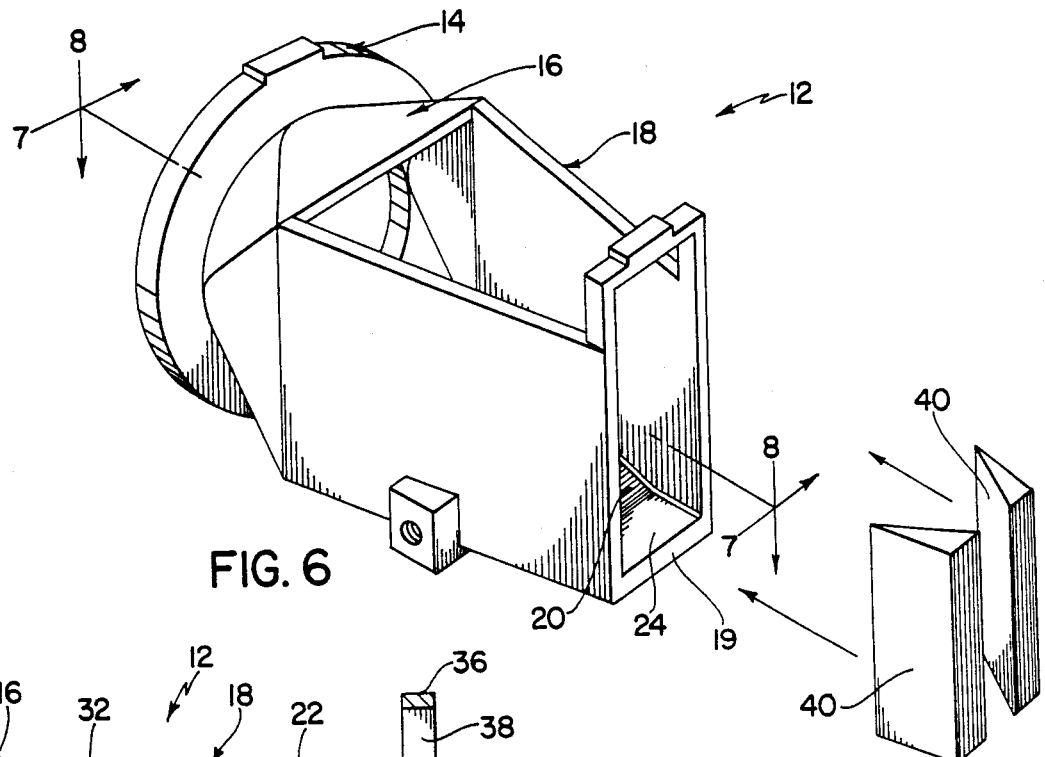
FIG. 6 is an exploded perspective view of a second embodiment of the device of the instant invention.
Figure 7:
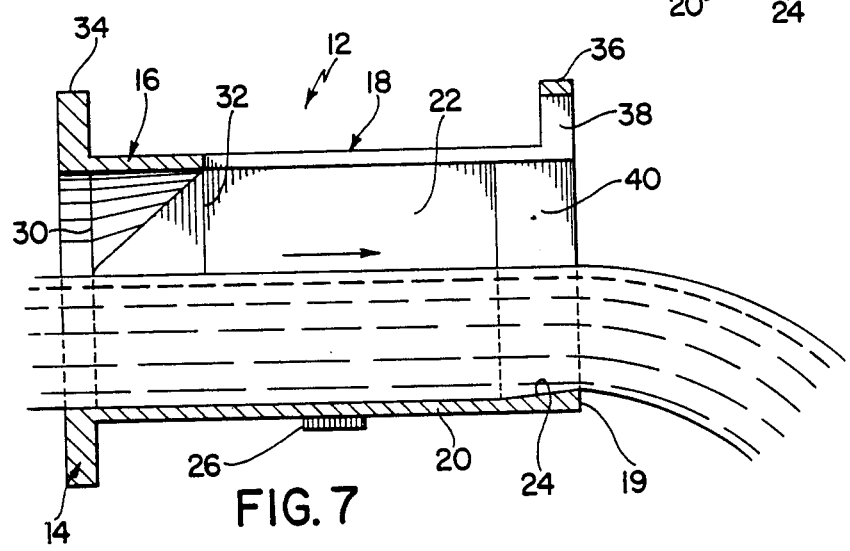
FIG. 7 is a sectional view taken along line 7—7 in FIG. 6.
Figure 8:
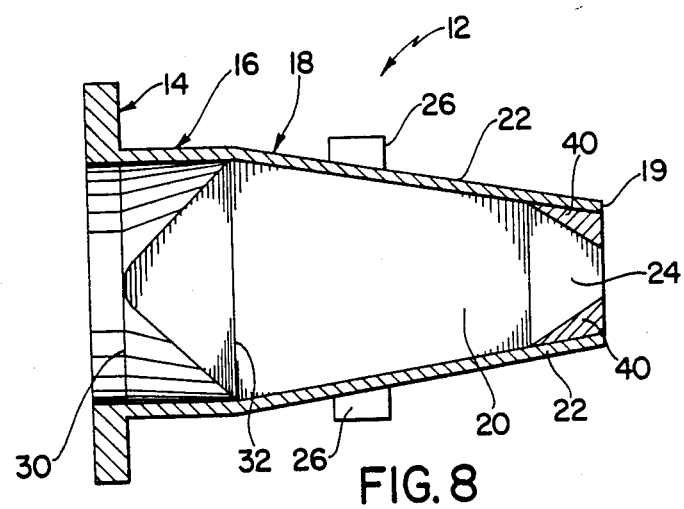
FIG. 8 is a sectional view taken along line 8—8 in FIG. 6.

Referring now to the drawings, a first embodiment of the flow measuring device of the instant invention is illustrated in FIGS. 1 through 5 and generally indicated at 10, and a second embodiment of the flow measuring device is illustrated in FIGS. 6 through 8 and generally indicated at 12. The flow measuring devices 10 and 12 are operative for measuring the flow rates of fluids in partially filled, gravity-fed conduits. More specifically, the devices 10 and 12 are adapted for measuring the flow rates of fluids in applications wherein they are mounted on the outlet ends of pipe sections in substantially horizontal dispositions so that fluids passing through the devices 10 and 12 can pass or spill freely from the outlet ends thereof.

Referring first to FIGS. 1 through 5, the device 10 is illustrated. The device 10 is preferably integrally cast from a suitable metal, such as steel or stainless steel, and it comprises sequentially disposed inlet, transition and converging sections generally indicated at 14, 16 and 18, respectively. The inlet section 14 has a substantially circular inner cross-sectional configuration, and it is adapted to be received and secured in mating engagement with a flange on the end of a pipe section of corresponding diameter. The converging section 18 terminates in a reduced downstream end 19, and it is of generally rectangular configuration, although it is open at the upper end thereof. Specifically, the converging section 18 comprises a bottom wall 20 and a pair of spaced, substantially straight sidewalls 22 which extend substantially perpendicularly upwardly from the bottom wall 20 and converge in a downstream direction to define a gradually reducing width in the converging section 18. Integrally formed on the upper surface of the bottom wall 20 adjacent the downstream end 19 is an upwardly inclined lip 24, and formed along the opposite sidewalls 22 adjacent the bottom wall 20 are pressure taps 26 having apertures 28 therein. The transition section 16 has an upstream end 30 which has a substantially circular interior cross-sectional configuration and which is integrally attached to the inlet section 14, and a downstream end 32 which has a substantially rectangular interior cross-sectional configuration and which is integrally attached to the converging section 18. The inner configuration of the transition section 16 is preferably formed to provide a substantially smooth, even transition between the substantially circular inlet section 14 and the substantially rectangular converging section 18. The width of the transition section 16 is preferably substantially equal to the diameter of the inlet section 14, and it is preferably substantially uniform throughout its extent so that the width of the opening at the upstream end of the converging section 18 is substantially the same as the diameter of the opening in the inlet section 14. The transition 16 section preferably has a longitudinal extent which is at least one half of the diameter of the inlet section 14, since it has been found that a distance of this amount is frequently necessary to enable fluids to pass through the transition section 16 without producing significant quantities of turbulence and/or irregular flow characteristics therein. Formed on the upper extremity of the inlet section 14 is a leveling foot 34, and a leveling foot 36 of similar configuration is mounted on a pair of spaced, upstanding arms 38 which extend from the sidewalls 22 of the converging section 18 adjacent the downstream end 19. The feet 34 and 36 are preferably constructed so that they are in a plane which is substantially parallel to the plane of the bottom wall 20, and accordingly, they can be utilized for supporting a leveling device in order to determine whether or not the flow measuring device 10 is properly mounted in a horizontal disposition.

For use and operation of the flow measuring device 10, the inlet section 14 is connected to the flange on the outlet end of a pipe section so that the device 10 is positioned in a substantially horizontal disposition, and conventional pressure sensing elements are connected to one or both of the pressure taps 26. Thereafter, the device 10 can be utilized for determining the flow rate of a fluid passing therethrough to determine the flow rate of the fluid passing through the pipe section. Specifically, since the bottom wall 20 is substantially horizontal and the sidewalls 22 are substantially vertical and perpendicular to the bottom wall 20, the level of a fluid in the converging section 18 is directly proportional to the pressure sensed by the pressure sensing elements in the taps 26. Accordingly, since the flow rate of a fluid passing through the device 10 corresponds to the height of the fluid in the converging section 18, it is possible to experimentally determine a flow curve for the device and to thereafter calculate the flow rate of the fluid passing through the device 10 from the flow curve and the pressure sensed by one of the pressure sensing elements in the pressure taps 26. In fact, it has been found that it is possible to calculate the flow rate of a fluid passing through the device 10 with a high degree of accuracy and repeatability in this manner. In this connection, since the device 10 includes the transition section 16, irregular flow patterns and turbulence are not normally introduced into a fluid passing through the device 10 as the fluid enters into the converging section 22, and hence the flow rate of the fluid can be effectively and accurately determined. Further, when it is necessary to calibrate the device 10 for zero-flow conditions, the lip 24 retains residual fluids in the device 10 and the pipe sections connected thereto so that it is not normally necessary to wait for prolonged periods of time for residual fluids to drain from the device 10 and the piping system to which it is connected.

Referring now to FIGS. 6 through 8, the device 12 is illustrated. As will be seen, the device 12 is generally similar in configuration to the device 10, and it includes sequentially disposed inlet, transition and converging sections 14, 16 and 18, respectively, which are dimensioned and configured similar to the corresponding sections of the device 10. The device 12, however, further comprises a pair of removable inserts or restrictors 40 which are removably secured to the inner sides of the sidewalls 22 adjacent the downstream end 19. The inserts 40 are preferably of wedge-shaped configuration, and they are preferably secured to the inner sides of the sidewalls 20 in substantially vertical dispositions adjacent the downstream end 19 so that they gradually further reduce the width of the open area in the converging section 18, as illustrated most clearly in FIG. 8. In this connection, the inserts 40 are preferably constructed so that they extend upwardly from the lip 24 to the upper extremities of the sidewalls 22, and they are preferably removably secured in the converging section 18 with screws or the like (not shown) which extend through the inserts 40 and into the sidewalls 20, it being understood, however, that the use of a variety of other removable securing means for the inserts 40 is contemplated.

For use and operation of the device 12, it is connected to a pipe section in a manner similar to that hereinabove described with respect to the device 10. However, since the inserts 40 restrict the width of the downstream end portion of the converging section 18, they reduce the capacity of the device 12 so that it can be efficiently operated at lower or reduced flow rates. However, if, at a later date, it becomes necessary to increase the capacity of the device 12, it is possible to remove the inserts 40 so that the width of the opening in the converging section 18 adjacent the outlet end 19 is increased. In this regard, once the inserts have been removed, the device 12 is identical to the device 10, and it is operative in a manner similar to that hereinabove described.

It is seen, therefore, that the instant invention provides an effective flow measuring device for measuring the flow rates of fluids through partially filled pipe sections. In this connection, since the devices 10 and 12 include transition sections 16, fluids can be passed from the inlet sections 14 thereof to the converging sections 18 thereof without causing excessive turbulence or irregular flow patterns in the fluids. Further, since the devices 10 and 12 have converging sections 18 which have substantially vertical sidewalls 22, it is possible to easily correlate the pressures measured in the taps 26 thereof with the vertical heights of the fluids in the converging sections 18 thereof. In addition, since the devices 10 and 12 have relatively simple interior configurations, they can be easily inspected. Still further, since the device 12 can be adapted to operate effectively under different flow ranges, it has a significantly increased degree of versatility. Accordingly, it is seen that for these reasons, as well as the other reasons hereinabove set forth, the instant invention provides an effective flow measuring device which represents a significant improvement in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for measuring the flow rate of a fluid in a partially filled conduit comprising connected, sequentially disposed inlet, transition and converging sections, said inlet section having a substantially circular interior cross-sectional configuration, said converging section terminating in a substantially open downstream end and comprising a substantially flat bottom wall and a pair of spaced longitudinally converging sidewalls which extend substantially perpendicularly upwardly from said bottom wall, said transition section having an interior configuration which provides a substantially smooth transition between said inlet section and said converging section, and means for determining the fluid level in said converging section, and removable insert means gradually further reducing the width of said converging section adjacent said downstream end whereby when said inlet section is connected to said conduit and said device is positioned so that said bottom wall is in a substantially horizontal disposition wherein the downstream end of said converging section is substantially open and unobstructed, said level indicating means is operative for providing an indication of the rate of flow of said fluid through said conduit.

2. In the device of claim 1, said insert means comprising a pair of removable inserts in said converging section, said inserts being positioned along said sidewalls adjacent said downstream end and cooperating to gradually reduce the width of said converging section adjacent said downstream end.

3. In the device of claim 2, said inserts further characterized as being of wedge-like configuration.

4. A device for measuring the flow rate of a fluid in a partially filled conduit comprising connected, sequentially disposed inlet, transition and converging sections, said inlet section having a substantially circular interior cross-sectional configuration, said converging section terminating in a substantially open downstream end and comprising a substantially flat bottom wall and a pair of spaced longitudinally converging sidewalls which extend substantially perpendicularly upwardly from said bottom wall, and a lip on said bottom wall adjacent the downstream end thereof, said transition section having an interior configuration which provides a substantially smooth transition between said inlet section and said converging section, and means for determining the fluid level in said converging section, whereby when said inlet section is connected to said conduit and said device is positioned so that said bottom wall is in a substantially horizontal disposition wherein the downstream end of said converging section is substantially open and unobstructed, said level indicating means is operative for providing an indication of the rate of flow of said fluid through said conduit.

5. A device for measuring the flow rate of a fluid in a partially filled conduit comprising connected, sequentially disposed inlet, transition and converging sections, said inlet section having a substantially circular interior cross-sectional configuration, said converging section terminating in a substantially open downstream end and comprising a substantially flat bottom wall and a pair of spaced longitudinally converging sidewalls which extend substantially perpendicularly upwardly from said bottom wall, said transition section having an interior configuration which provides a substantially smooth transition between said inlet section and said converging section, the upstream end of said converging section having a width which is substantially equal to the diameter of said inlet section, and means for determining the fluid level in said converging section, whereby when said inlet section is connected to said conduit and said device is positioned so that said bottom wall is in a substantially horizontal disposition wherein the downstream end of said converging section is substantially open and unobstructed, said level indicating means is operative for providing an indication of the rate of flow of said fluid through said conduit.

6. In the device of claim 5, said transition section having a length of at least one-half of the diameter of said inlet section.

* * * * *